United States Patent
Bougon (10) Patent No.: US 8,904,279 B1
(45) Date of Patent: Dec. 2, 2014

(54) INHIBITING AUTOMATED EXTRACTION OF DATA FROM NETWORK PAGES

(75) Inventor: Steven M. Bougon, San Francisco, CA (US)

(73) Assignee: Amazon Technologies, Inc., Seattle, WA (US)

( * ) Notice: Subject to any disclaimer, the term of this patent is extended or adjusted under 35 U.S.C. 154(b) by 287 days.

(21) Appl. No.: 13/313,304

(22) Filed: Dec. 7, 2011

(51) Int. Cl.
*G06F 17/00* (2006.01)

(52) U.S. Cl.
USPC ............ 715/236; 715/234; 715/235; 705/51; 705/57; 726/26; 726/32; 726/33

(58) Field of Classification Search
USPC ................................................ 715/234, 236
See application file for complete search history.

(56) References Cited

U.S. PATENT DOCUMENTS

| | | | | |
|---|---|---|---|---|
| 5,450,593 | A * | 9/1995 | Howell et al. | 726/21 |
| 6,981,217 | B1 * | 12/2005 | Knauft et al. | 715/210 |
| 7,188,241 | B2 * | 3/2007 | Cronce et al. | 713/155 |
| 7,322,006 | B1 * | 1/2008 | Ohashi | 715/229 |
| 7,475,242 | B2 * | 1/2009 | Baird et al. | 713/166 |
| 7,797,354 | B2 * | 9/2010 | Sattler et al. | 707/809 |
| 7,802,305 | B1 * | 9/2010 | Leeds | 726/26 |
| 7,805,673 | B2 * | 9/2010 | der Quaeler et al. | 715/255 |
| 8,312,297 | B2 * | 11/2012 | Sato et al. | 713/194 |
| 8,584,005 | B1 * | 11/2013 | Pittenger et al. | 715/233 |
| 8,621,652 | B2 * | 12/2013 | Slater, Jr. | 726/28 |
| 2006/0010148 | A1 * | 1/2006 | Sattler et al. | 707/101 |
| 2006/0075228 | A1 * | 4/2006 | Black et al. | 713/167 |
| 2008/0181396 | A1 * | 7/2008 | Balakrishnan et al. | 380/28 |
| 2009/0158430 | A1 * | 6/2009 | Borders | 726/23 |
| 2010/0005306 | A1 * | 1/2010 | Izu et al. | 713/176 |
| 2012/0159296 | A1 * | 6/2012 | Rebstock et al. | 715/205 |

OTHER PUBLICATIONS

Retrologic Systems, Jun. 26, 2010, pp. 1-3 http://www.retrologic.com/retroguard-faq.html.*
About.com, Comments on Comments, Feb 18, 2009, pp. 1-4 http://webdesign.about.com/od/beginningtutorials/a/aa050503a.htm.*
Pixel2life.com, "Converting Tables to a CSS Div Tag and XHTML validated layout", Feb. 23, 2011, pp. 1-10 http://www.pixel2life.com/publish/tutorials/33/converting_tables_to_a_css_div_tag_and_xhtml_validated_layout/.*
How to Phish, Protect Your Email, and Defeat Copy-and-Paste With CSS, Oct. 1, 2010, pp. 1-4 http://www.azarask.in/blog/post/protecting-email-with-css/.*
Retrologic Systems, Jun. 26, 201 O, pp. 1-3 http://www.retrologic.com/retroguard-faq, html.*
About.com, Comments on Comments, Feb. 18, 2009, pp. 1-4 http://webdesign.about.com/od/beginningtutorials/a/aa050503a.htm.*

(Continued)

*Primary Examiner* — Stephen Hong
*Assistant Examiner* — Mario M Velez-Lopez
(74) *Attorney, Agent, or Firm* — Davis Wright Tremaine LLP (57) ABSTRACT

Disclosed are various embodiments for inhibiting or preventing automated data extraction from network pages. A source for a network page having a document structure is obtained. An obfuscated network page is generated from the network page by altering the document structure to inhibit automated extraction of data. The obfuscated network page is configured to have a visual appearance that is the same as that of the network page when rendered by a client for display. The obfuscated network page is sent to the client in response to a request from the client for the network page.

27 Claims, 4 Drawing Sheets

(56) References Cited

OTHER PUBLICATIONS

Pixel2life.com, "Converting Tables to a CSS Div Tag and XHTML validated layout", Feb. 23, 2011, pp. 1-10 http://www.pixe~2~ife. c~m/pub~ish/tut~ria~s/33/c~nverting~tab~es-t~-a-css-div-tag and xhtml_validated_layoutJ.*

Cross-Site Request Forgeries, Dec. 2004, pp. 1-6 http://shiflett.org/articles/cross-site-request-forgeries.*

* cited by examiner

INHIBITING AUTOMATED EXTRACTION OF DATA FROM NETWORK PAGES

BACKGROUND

Many software applications are directed to extracting data from network pages in an automated fashion. Such applications may be referred to as scripts, robots, web scrapers, and so on. A web scraper may obtain content from a web site automatically and include the content on another web site, resell the content to others, analyze the content, and/or perform other tasks. Web scrapers may impose a cost on web site owners by consuming resources, such as network bandwidth and processor time.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to inhibiting or preventing automated extraction of data from network sites. Network site owners and content owners may view web scraping as a serious problem. Owners may have little or no control over how the extracted content is used. The scrapers may profit from the extracted content, potentially to the detriment of the owners. The robots exclusion standard establishes a convention that allows network site owners to specify whether automated clients (i.e., robots) are allowed to access and/or use certain network pages. However, the robots exclusion standard is purely advisory, and nothing enforces compliance. Therefore, malicious web scrapers are likely to ignore it.

Various embodiments of the present disclosure facilitate obfuscation of network pages so as to inhibit scraping of data from the network pages. Web scrapers rely on the document structure of a network page being relatively constant. As a non-limiting example, a description of a product offered for sale in a network page might be in a certain location of network page code and with a certain identifier. A web scraper may automatically examine multiple network pages having a common document structure to ascertain the location of the description in the document structure. Alternatively, a user may manually indicate the location of the description in the document structure to the web scraper, which may then operate in an automated manner. The web scrapers are no longer able to operate in an automated manner if frequent adjustments are made to the document structure of the network pages as will be described.

The changes made to obfuscate the network pages are implemented so as not to alter the visual appearance of the network pages when rendered by a client for display. Accordingly, the end-user experience remains unaffected for a majority of users. In one embodiment, the network page obfuscation may be disabled for visually impaired users so as not to impact screen reading software that relies upon the document structure of network pages. Companies and other entities that rely on scraping may be encouraged to move to a service-based architecture that facilitates access to content by way of an application programming interface (API). Through a service-based architecture, content access may be monitored and controlled, and acceptable use policies may be enforced. In the following discussion, a general description of the system and its components is provided, followed by a discussion of the operation of the same.

Figure 1:
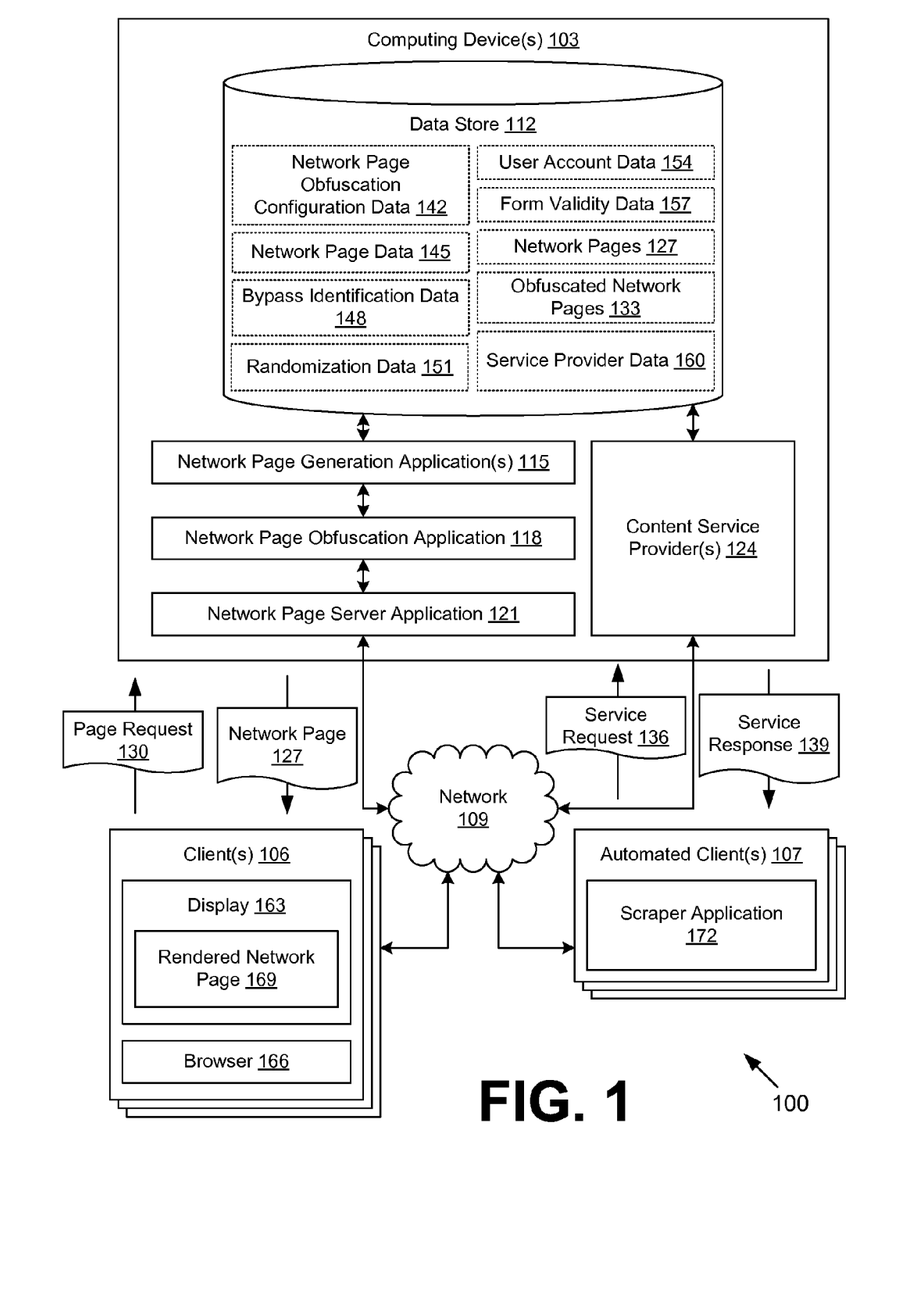
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 and one or more automated clients 107 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include one or more network page generation applications 115, a network page obfuscation application 118, a network page server application 121, one or more content service providers 124, and other applications, services, processes, systems, engines, or functionality not discussed in detail herein. The network page generation applications 115 are executed to generate network pages 127 or portions thereof in response to page requests 130. As used herein, a network page 127 may correspond to a web page, mobile application page, or any other form of network content. For example, a network page 127 may include hypertext markup language (HTML), extensible markup language (XML), cascading style sheets (CSS), extensible style sheet language transformations (XSLT), JavaScript, VBScript, images, animations, videos, audio, and/or other data. A network page 127 has a document structure, which, when rendered by a client 106 for display, has a certain visual appearance. The document structure may correspond to a document object model (DOM) having a plurality of elements.

The network page generation applications 115 may generate portions of network pages 127 or components that are used in assembling a network page 127. Different network page generation applications 115 may generate different network page components. For example, a network page component may correspond to a particular content item featured in a network page 127. In various embodiments, the network page generation applications 115 may be implemented using a service-oriented architecture. Further, one network page generation application 115 may generate a network page 127 or portion thereof based at least in part on network page components obtained from other network page generation applications 115. In one embodiment, network pages 127 may be static and stored in the data store 112.

The network page obfuscation application 118 is executed to transform the network pages 127 generated by the network page generation application 115 so as to generate obfuscated network pages 133. The obfuscated network pages 133 are versions of the network pages 127 which are adjusted or altered so as to inhibit automated extraction of data or content. Adjustments may be made to the document structure of the network pages 127 so that the document structure appears to change in a randomized manner to the automated clients 107. In other words, the automated clients 107 are unable to discern a predictable document structure from the obfuscated network pages 133 and are therefore unable to extract data. Meanwhile, the adjustments are implemented so as not to effect a change to the visual appearance of the network page 127 as rendered by a client 106.

Additionally, in some embodiments, the network page obfuscation application 118 may be configured to alter form elements in an obfuscated network page 133 to inhibit automated form submission. To this end, a token may be embedded into one or more modified form elements that may be correlated with a period of validity for the form. If a robot submits a form according to the token after the period of validity, the form submission may be rejected. This differs from challenge-response tests such as CAPTCHAs in that automated form submission here is inhibited on the backend. Consequently, the user experience is unaffected and may be undiminished by challenge-response tests which users may find annoying.

The network page server application 121 is executed to serve up obfuscated network pages 133 over the network 109 to clients 106 and automated clients 107 as network pages 127 in response to page requests 130. In various embodiments, the network page server application 121 may include a hypertext transfer protocol (HTTP) server. Non-limiting examples of commercially available HTTP servers include Apache® HTTP Server, Apache® Tomcat®, Microsoft® Internet Information Services (IIS), etc.

The content service providers 124 may provide an API for accessing various data included in the network pages 127 in a programmatic way. To this end, the content service providers 124 may obtain service requests 136 over the network 109 and respond with service responses 139. The service requests 136 and service responses 139 may comprise JavaScript object notation (JSON), yet another markup language (YAML), XML, and/or other data formatting languages. The service requests 136 and service responses 139 may be sent by way of HTTP, simple object access protocol (SOAP), representational state transfer (REST), and/or other data communication protocols. In one embodiment, the service request 136 includes an account identifier that facilitates access control and usage monitoring.

The data stored in the data store 112 includes, for example, network page obfuscation configuration data 142, network page data 145, bypass identification data 148, randomization data 151, user account data 154, form validity data 157, network pages 127, obfuscated network pages 133, service provider data 160, and potentially other data. The network page obfuscation configuration data 142 includes various parameters that control the operation of the network page obfuscation application 118. For example, it may be designated that some network pages 127 are to be obfuscated, while others are not to be obfuscated. Also, the network page obfuscation configuration data 142 may control the types of document structure adjustments that are employed as part of the obfuscation.

The network page data 145 includes various data used in the generation of network pages 127, including code, templates, text, content, images, video, audio, animations, and/or other data. The bypass identification data 148 includes data used in the identification of clients 106 for which the obfuscation procedures should be bypassed. Such clients 106 may include clients 106 which employ screen reader applications, clients 106 which employ outdated web browsers, automated clients 107 which are permitted, and other clients 106 which provide a type of bypass identifier. In one embodiment, the bypass identification data 148 includes data to identify user agent strings from the page requests 130 which correspond to known screen reader applications. Also, it may be desirable to allow certain "friendly" web robots (e.g., those associated with search engines, etc.) to bypass the obfuscation mechanism. Such automated clients 107 may be identified by user agent, source network address, and/or other data. Finally, it may be desirable to bypass the obfuscation mechanism for testing and/or other purposes by supplying a uniform resource locator (URL) parameter or other indicator.

The randomization data 151 may include stored randomizations which are used to adjust the document structure of a network page 127 for obfuscation. User account data 154 includes data relating to user accounts with the network site. The user account data 154 may include data that facilitates authentication of clients 106 and/or automated clients 107 by way of username, password, security token, public key encryption, etc. The user account data 154 may include a setting that, when enabled, identifies the account as being associated with a bypass client 106 such as a screen reader client 106, etc. The user account data 154 may also include data that indicates privileges and/or restrictions relating to access to content service providers 124.

The form validity data 157 includes data that may be used to determine whether a form submission is valid. For example, if a form in a network page 127 is modified by the network page obfuscation application 118, a form submission from the network page 127 may be determined to be valid or invalid according to certain temporal criteria. If, say, five hours or some other time period has elapsed since the network page 127 was generated, the form submission may be adjudged to be invalid. The form submission may be configured to include a token to indicate validity.

The network pages 127 and the obfuscated network pages 133 may be stored or cached by the data store 112. The service provider data 160 may include data describing access to content of the network pages 127 through the content service provider 124. The service provider data 160 may be employed to generate a notification or source code comment in the obfuscated network pages 133 to alert a reader that data scraping is being inhibited and to provide information regarding alternative approaches to accessing the content (e.g., by way of the APIs of the content service providers 124 and other approaches).

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 163. The display 163 may comprise, for example, one or more devices such as cathode ray tubes (CRTs), liquid crystal display (LCD) screens, gas plasma-based flat panel displays, LCD projectors, or other types of display devices, etc.

The client 106 may be configured to execute various applications such as a browser 166 and/or other applications. The browser 166 may be executed in a client 106, for example, to originate page requests 130 and to access and render network pages 127, such as web pages, or other network content served up by the computing device 103 and/or other servers, thereby generating a rendered network page 169 on the display 163. In some cases, the user of the client 106 may be visually impaired and the browser 166 may correspond to a screen reader client application. The client 106 may be configured to execute applications beyond browser 166 such as, for example, mobile applications, email applications, instant message applications, and/or other applications.

The automated client 107 is representative of a plurality of client devices that may be coupled to the network 109. The automated client 107 may comprise, for example, a processor-based system such as a computer system. Such a computer system may be embodied in the form of a server computer, a cloud computing resource, a desktop computer, a laptop computer, personal digital assistants, cellular telephones, smartphones, set-top boxes, music players, web pads, tablet computer systems, game consoles, electronic book readers, or other devices with like capability.

The automated client 107 may be configured to execute various applications such as a scraper application 172 and/or other applications. The scraper application 172 may be executed in the automated client 107 to obtain network pages 127 from the computing device 103 and to extract data from the network pages 127. The extracted data may be stored, analyzed, processed, and/or forwarded to another system for processing. In some cases, the extracted data, or a derivative thereof, may be served up by another network site. The scraper application 172 may function by recognizing document structure patterns in various network pages 127 served up by the computing device 103. The automated client 107 may be configured to execute applications beyond the scraper application 172 such as, for example, browser applications, data processing applications, network page server applications, mobile applications, email applications, instant message applications, and/or other applications.

Next, a general description of the operation of the various components of the networked environment 100 is provided. To begin, a network page request 130 is issued by a client 106 or an automated client 107 and sent to the computing device 103 by way of the network 109. The network page request 130 is provided to the network page obfuscation application 118. The network page obfuscation application 118 determines whether the network page 127 corresponding to the request should be obfuscated. If the network page request 130 pertains to a screen reader application executed in a client 106, it may be determined that the network page 127 is not to be obfuscated.

Also, the network page obfuscation application 118 may determine whether a new randomization is to be applied. In one embodiment, the network page obfuscation application 118 may be configured to apply a different randomization or obfuscation on each occasion that a network page 127 is requested. In another embodiment, the network page obfuscation application 118 may apply the same randomization or obfuscation for an interval or period of time, e.g., for an hour, week, or other time period. It may be desirable to minimize the period of time between randomizations to prevent adaptation by the scraper applications 172. However, it might not be desirable to change the randomization upon every request due to processing load, benefits associated with data caching, and/or other reasons.

The network page obfuscation application 118 obtains the requested network page 127 and/or network page components for the network page 127 from the network page generation application(s) 115. The network page obfuscation application 118 alters or adjusts the document structure of the network page 127 to generate an obfuscated network page 133 so as to inhibit the automated harvesting of data from the obfuscated network page 133. However, the alterations or adjustments are selected so as not to change the visual appearance of the rendered network page 169 in the client 106. Several non-limiting examples of adjustments or alterations will next be discussed.

The network page obfuscation application 118 may add one more elements to the document structure which have no discernable effect on the visual appearance of the rendered network page 169. For example, the network page obfuscation application 118 may add whitespace or comments to the source files of the network pages 127 which may affect parsing or interpretation by the scraper application 172. The network page obfuscation application 118 may add DIVs, SPANs, or other HTML elements which are configured (e.g., by CSS) to be hidden. The network page obfuscation application 118 may add single-pixel transparent images, empty tables, empty table rows, empty table cells, etc. to confuse the scraper application 172 as to the location of its desired data.

If a browser 166 renders such HTML elements as whitespace or additional lines, the network page obfuscation application 118 may replace paragraph breaks or line breaks in the network page 127 with the different HTML elements. Likewise, blank space in the rendered network page 169 may be replaced with transparent images, transparent text, and/or other elements. Further, the network page obfuscation application 118 may rearrange the sequence of various HTML elements, which may be reconfigured to maintain the previous visual appearance. For example, a footer of a network page 127 may be moved from the end of an HTML file to the beginning of the HTML file with possible reconfiguration to tables, CSS, or other elements to effect the change without impacting the visual appearance of the footer.

The network page obfuscation application 118 may transform one HTML element into another HTML element, or groups of HTML elements into another HTML element or elements. For example, the network page obfuscation application 118 may replace a SPAN element with a DIV element, or vice versa. Thus, as a non-limiting example, <DIV id="ID1">Important Text</DIV> may be transformed into <SPAN id="ID2">Important Text</SPAN>. It is noted that DIVs and SPANs have different default characteristics that result in different visual appearances. That is to say, a DIV is considered to be a block HTML element, while a SPAN is considered to be an inline HTML element. However, by way of CSS, a SPAN may be modified to have the visual appearance of a DIV. If, for example, a scraper application 172 is seeking the "Important Text" in the ninth DIV of an HTML file for the network page 127, the scraper application 172 may be unable to recognize the "Important Text" once it is enclosed in the SPAN element. Similarly, P elements may be replaced with DIV elements, SPAN elements may be replaced with FONT elements, DIV-based layouts may be replaced with table-based layouts, and so forth.

The network page obfuscation application 118 may change the class attribute names or identifier names associated with various elements of the network page 127. For example, a product title in the original network page 127 may be enclosed within a DIV element having a descriptive identifier which may aid the scraper application 172: <DIV id="productTitle">Great Product</DIV>. To confuse the scraper application 172, the network page obfuscation application 118 may replace the descriptive identifier with a randomized identifier such as "eqnnoa32rfQ" or "productTitle39204920." In some embodiments, the randomized identifier may be derived from the original identifier by way of a one-way hash function, an encryption function, or another approach. The original identifier may or may not be apparent from the randomized identifier. In many cases, all references to the original identifier, whether in HTML, CSS, JavaScript, etc., will be replaced with the same randomized identifier to preserve the original relationship among the elements.

It is noted that the example modifications described above with respect to the network page obfuscation application 118 do not require manual attention by the developers of the network pages 127. The developers can continue to create network pages 127 having descriptive attribute names and preferred layout mechanisms, and the network page obfuscation application 118 will operate automatically to generate the apparently random transformations in the obfuscated network pages 133.

In addition to confusing the scraper applications 172 due to repeated modifications to the same network page 127, the network page obfuscation application 118 may also modify similar network pages 127 in different ways. For example, network pages 127 corresponding to product detail pages may be generated by the network page generation application 115 according to a shared template from the network page data 145. A scraper application 172 may be configured to recognize data in the network pages 127 based at least in part on the commonality of the document structure among the network pages 127 resulting from the shared template. To counteract this, the network page obfuscation application 118 may obfuscate network pages 127 generated from the shared template in a different manner, especially when requested at or near the same time or during a randomization time interval.

The network page obfuscation application 118 may also be configured to modify forms embedded in network pages 127. For example, the order of the form input elements in the network page 127 may be randomized to confuse automated clients 107 while maintaining the same visual order in the rendered network page 169. Furthermore, the network page obfuscation application 118 may rename various form elements in an apparently randomized manner. The form elements, which may be HTML form elements or other form elements, may have names which are encoded for verification to prevent robots from auto-filling the forms. In one example, a text input field may have a name of "searchQuery." The name may be modified to embed a token that identifies a temporal condition under which the form corresponding to the HTML form element may be accepted for processing. Thus, in this example, a current timestamp (e.g., 1320850304) may be concatenated with the previous name, thereby resulting in "searchQuery1320850304." The name and token may be transformed, encrypted, or combined differently in other examples.

Based on the presence of the token, the network page generation application 115, or another application which evaluates the form data, is able to determine whether the form data was submitted soon after the obfuscated network page 133 was generated or at some time later. Robots are likely to cache the form from the obfuscated network page 133 and use it repeatedly and potentially much later. Thus, auto-filling may be restricted to a certain time window based upon the token. Alternatively, the token may be regenerated upon each page request 130 and may correspond to a single-use token that prevents repeated use of the same form name combinations. Tokens may also be associated with information related to the page request 130 to inhibit later auto-filling, e.g., internet protocol (IP) address of the client 106, session identifier, referring uniform resource identifier (URI), etc. Information about tokens and their detection and validity may be stored in the form validity data 157.

In one embodiment, the obfuscated network page 133 may include an embedded source code comment explaining an approach for automated access to content of the network page 127 via an application programming interface (API). The owner of the network site may wish to allow controlled access to content of the network site. Since the network page 127 is obfuscated to inhibit automated data extraction, the source code comment may be provided to encourage operators of automated clients 107 to obtain the content through the alternative approach. When the operator of the automated client 107 realizes that the automated scraping is no longer functioning, the operator may look at the source code of the network page 127 and see the comment. Accordingly, the operator may configure an application of the automated client 107 to initiate service requests 136 for content and to obtain service responses 139 with the content from one or more content service providers 124.

After the obfuscated network page 133 is generated, the network page server application 121 sends the obfuscated network page 133 to the client 106 (or to the automated client 107) as the requested network page 127. In some embodiments, the obfuscated network page 133 may be stored or cached in the data store 112 for use in responding to future page requests 130.

In one embodiment, the network page generation application 115 may include the network page obfuscation application 118. For example, the source files in the network page data 145 corresponding to the network pages 127 may include one or more intermediate elements that each correspond to a respective consistent visual markup effect. The network page obfuscation application 118 may be configured to transform these intermediate elements into different HTML elements depending on the current randomization. As a non-limiting example, a source file may enclose a paragraph within customized XML such as "<PARA>" and "</PARA>." According to one randomization, the output may be a DIV element configured with CSS in one way. According to another randomization, the output may be a SPAN element configured with CSS in another way. However, the output is configured to be rendered in the same way regardless of whether DIV or SPAN is used. Although customized XML is described in this example, customized functions in PHP, JavaServer Pages, Active Server Pages, etc. may instead be used.

Figure 2:
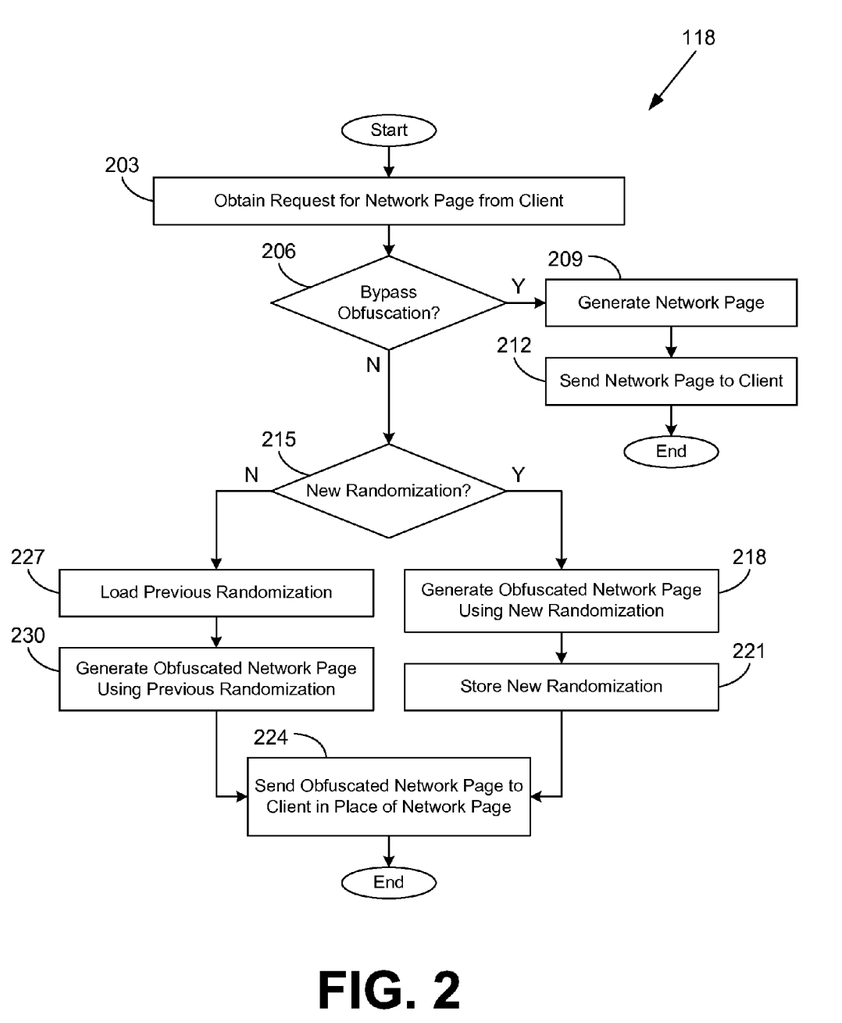
FIG. 2 is a flowchart illustrating one example of functionality implemented as portions of a network page obfuscation application executed in a computing device in the networked environment of FIG. 1 according to various embodiments of the present disclosure.

Referring next to FIG. 2, shown is a flowchart that provides one example of the operation of a portion of the network page obfuscation application 118 according to various embodiments. It is understood that the flowchart of FIG. 2 provides merely an example of the many different types of functional arrangements that may be employed to implement the operation of the portion of the network page obfuscation application 118 as described herein. As an alternative, the flowchart of FIG. 2 may be viewed as depicting an example of steps of a method implemented in the computing device 103 (FIG. 1) according to one or more embodiments.

Beginning with box 203, the network page obfuscation application 118 obtains a page request 130 (FIG. 1) for a network page 127 (FIG. 1) from a client 106 (FIG. 1) or an automated client 107 (FIG. 1). The page request 130, or a portion thereof, may be forwarded to the network page obfuscation application 118 by the network page server application 121 (FIG. 1). In box 206, the network page obfuscation application 118 determines whether the obfuscation procedure is to be bypassed. For example, the network page obfuscation application 118 may compare a user agent field of the page request 130 with known screen reader or friendly robot user agent strings in the bypass identification data 148 (FIG. 1). Alternatively, the network page obfuscation application 118 may determine whether the client 106 is authenticated as a screen reader or other bypass client 106 based at least in part on a setting in the user account data 154 (FIG. 1).

If the obfuscation procedure is to be bypassed, the network page obfuscation application 118 proceeds from box 206 to box 209. In box 209, the network page obfuscation application 118 generates or transfers the network page 127 without obfuscation. In box 212, the network page obfuscation application 118 sends the network page 127 to the client 106. The sending may be performed by way of the network page server application 121. Thereafter, the portion of the network page obfuscation application 118 ends.

If the network page obfuscation application 118 instead determines that the obfuscation procedure is not to be bypassed, the network page obfuscation application 118 proceeds from box 206 to box 215. In box 215, the network page obfuscation application 118 determines whether a new randomization is to be employed. For example, a particular randomization may be used for a certain time interval. If a new randomization is to be employed, the network page obfuscation application 118 proceeds to box 218 and generates an obfuscated network page 133 (FIG. 1) using a new randomization. In box 221, the network page obfuscation application 118 may store the new randomization in the randomization data 151 (FIG. 1) for future use. The network page obfuscation application 118 then proceeds to box 224.

If a new randomization is not to be employed, the network page obfuscation application 118 instead moves from box 215 to box 227. In box 227, the network page obfuscation application 118 loads a previous randomization from the randomization data 151. In box 230, the network page obfuscation application 118 generates the obfuscated network page 133 using the previously stored randomization. The network page obfuscation application 118 then transitions from box 230 to box 224. In box 224, the network page obfuscation application 118 sends the obfuscated network page 133 to the client 106 (or automated client 107, as the case may be) in place of the network page 127 that was requested. Thereafter, the portion of the network page obfuscation application 118 ends.

Figure 3:
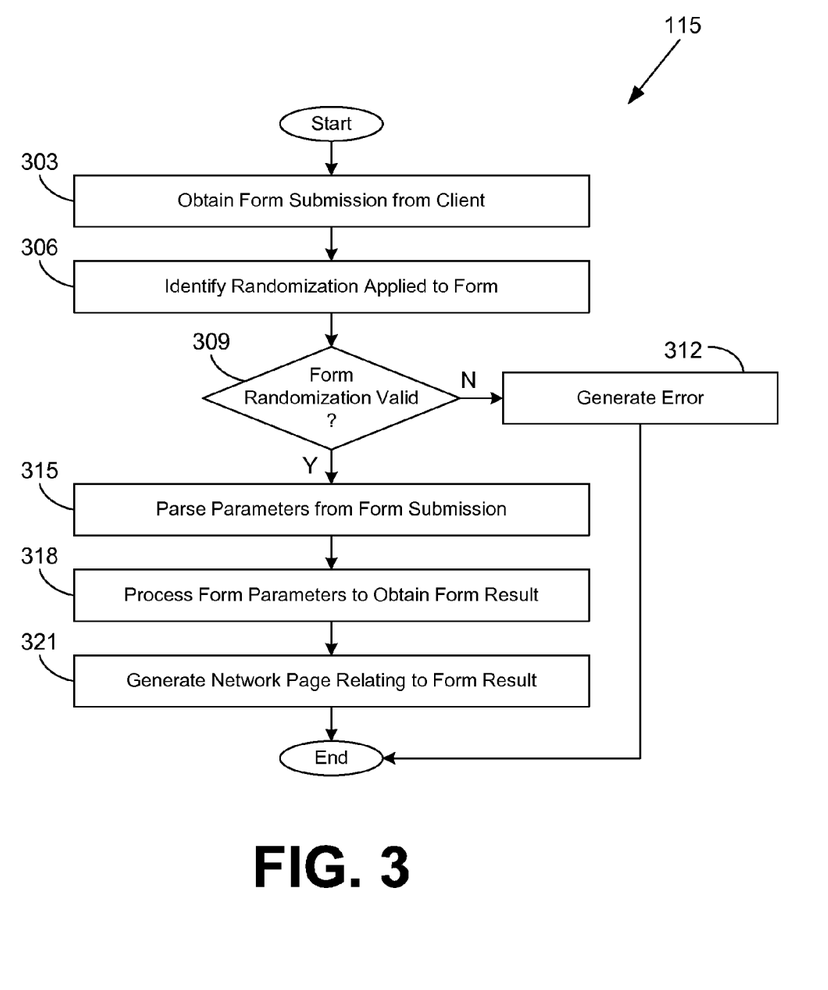
FIG. 3 is a flowchart illustrating one example of functionality implemented as portions of a network page generation application executed in a computing device in the networked environment of FIG. 1 according to various embodiments of the present disclosure.

Moving on to FIG. 3, shown is a flowchart that provides one example of the operation of a portion of the network page generation application 115 according to various embodiments. Specifically, the flowchart of FIG. 3 relates to a portion of the network page generation application 115 that facilitates form submission and processing. It is understood that the flowchart of FIG. 3 provides merely an example of the many different types of functional arrangements that may be employed to implement the operation of the portion of the network page generation application 115 as described herein. As an alternative, the flowchart of FIG. 3 may be viewed as depicting an example of steps of a method implemented in the computing device 103 (FIG. 1) according to one or more embodiments.

Beginning with box 303, the network page generation application 115 obtains a form submission from a client 106 (FIG. 1), or automated client 107 (FIG. 1) as the case may be. In some embodiments, the form submission may come to the computing device 103 as a "GET" or "POST" page request 130 (FIG. 1) to the network page server application 121 (FIG. 1). In box 306, the network page generation application 115 identifies a randomization applied to the form. For example, a token indicating validity may be associated with the randomization. In box 309, the network page generation application 115 determines whether the form randomization is valid.

As non-limiting examples, a form randomization for a form submission may be valid only when submitted in a certain time frame after the form was generated, only when submitted once, only when submitted by a client 106 meeting certain criteria, etc. If the form randomization is not valid, the network page generation application 115 moves to box 312 and generates an error, which may be sent to the client 106 or automated client 107 by the network page server application 121. Thereafter, the portion of the network page generation application 115 ends.

If the form randomization is determined to be valid, the network page generation application 115 moves from box 309 to box 315. In box 315, the network page generation application 115 parses parameters from the form submission. In box 318, the network page generation application 115 processes form parameters to obtain a form result. In box 321, the network page generation application 115 generates a network page 127 (FIG. 1) that relates to the form result. The network page 127 may then be sent to the client 106 by network page server application 121 or may be transformed first by the network page obfuscation application 118 (FIG. 1). Thereafter, the portion of the network page generation application 115 ends.

Figure 4:
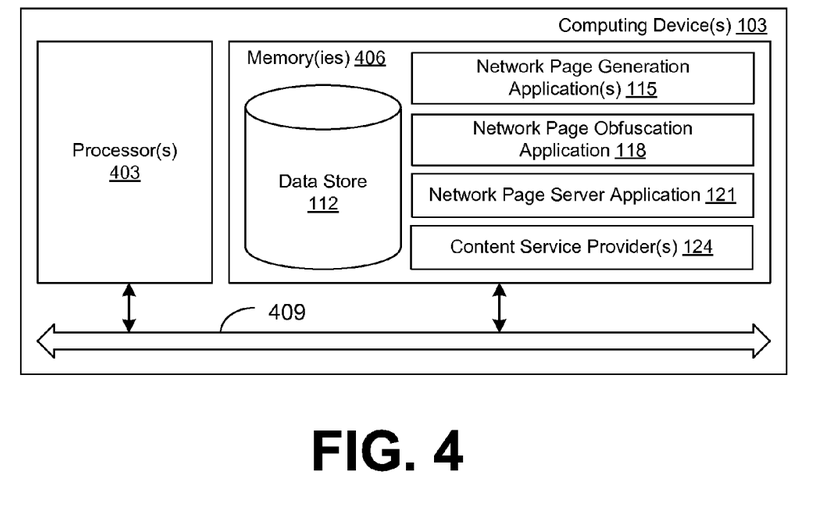
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 103 according to an embodiment of the present disclosure. The computing device 103 includes at least one processor circuit, for example, having a processor 403 and a memory 406, both of which are coupled to a local interface 409. To this end, the computing device 103 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the network page generation applications 115, the network page obfuscation application 118, the network page server application 121, the content service providers 124, and potentially other applications. Also stored in the memory 406 may be a data store 112 and other data. In addition, an operating system may be stored in the memory 406 and executable by the processor 403.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the network page generation applications 115, the network page obfuscation application 118, the network page server application 121, the content service providers 124, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 2 and 3 show the functionality and operation of an implementation of portions of the network page obfuscation application 118 and the network page generation application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the network page generation applications 115, the network page obfuscation application 118, the network page server application 121, and the content service providers 124, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
   code that, in response to receiving a network page comprising a document structure defined by a plurality of hypertext markup language (HTML) elements, including a first HTML element followed by a second HTML element, generates an obfuscated network page from the network page by altering the document structure in a randomized manner such that the second HTML element is followed by the first HTML element to inhibit automated extraction of data, wherein a visual appearance of the network page is defined at least in part by a cascading style sheet (CSS), and the obfuscated network page is configured to have a visual appearance that is the same as the visual appearance of the network page when rendered by a client for display;
   code that determines whether the client corresponds to a bypass client in response to receiving a request for the network page from the client;
   code that sends the network page to the client in response to the request and in response to determining that the client corresponds to the bypass client; and
   code that sends the obfuscated network page to the client in response to the request and in response to determining that the client does not correspond to the bypass client.

2. The non-transitory computer-readable medium of claim 1, wherein the code that generates the obfuscated network page is further configured to transform at least one of the plurality of HTML elements from a first HTML element type to a second HTML element type and to modify the CSS so that the at least one of the plurality of HTML elements has a same visual appearance as the first HTML element type despite being transformed to the second HTML element type, and the second HTML element type has a default visual appearance that differs from a default visual appearance of the first HTML element type.

3. The non-transitory computer readable medium of claim 1, wherein the code that generates the obfuscated network page is further configured to change an HTML tag identifier of at least one of the plurality of HTML elements.

4. The non-transitory computer-readable medium of claim 1, wherein the code that generates the obfuscated network page is further configured to add at least one hidden HTML element to the document structure.

5. The non-transitory computer-readable medium of claim 1, wherein the code that generates the obfuscated network page is further configured to modify at least one HTML form element of the network page to include a token identifying a temporal condition under which a form corresponding to the least one HTML form element may be accepted for processing.

6. The non-transitory computer-readable medium of claim 5, wherein the temporal condition corresponds to a period of time relative to generation of the obfuscated network page.

7. The non-transitory computer-readable medium of claim 1, wherein the code that generates the obfuscated network page is further configured to randomize an order of the first HTML element and the second HTML element in the network page while maintaining an unchanged visual order for the first HTML element and the second HTML element in the network page when rendered by the client for display.

8. A system, comprising:
   at least one computing device, and
   at least one application executable in the at least one computing device, the at least one application comprising:
   logic that, in response to receiving a source for a network page having a document structure including a first element followed by a second element, generates an obfuscated network page from the source by altering the document structure by altering a sequence of the first element and second element such that the second element is followed by the first element to inhibit automated extraction of data, wherein the obfuscated network page is configured to have a visual appearance that is the same as that of the network page when rendered by a client for display; and
   logic that sends the obfuscated network page to the client in response to a request from the client for the network page.

9. The system of claim 8, wherein the source includes a plurality of intermediate elements, and individual ones of the plurality of intermediate elements may be mapped to at least one of a plurality of hypertext markup language (HTML) elements depending on the altering.

10. The system of claim 8, wherein the altering of the document structure appears to the client to be randomized.

11. The system of claim 8, wherein the altering of the document structure is performed in response to the request from the client.

12. The system of claim 8, wherein the altering of the document structure is performed in response to an alteration time interval.

13. The system of claim 8, wherein the document structure includes a plurality of elements, and the logic that generates the obfuscated network page is configured to transform at least one of the plurality of elements from a first element type into a second element type.

14. The system of claim 13, wherein the logic that generates the obfuscated network page is configured to transform a visual appearance of the second element type into a visual appearance of the first element type for the at least one of the plurality of elements.

15. The system of claim 8, wherein the document structure includes a plurality of elements, and the logic that generates the obfuscated network page is configured to add at least one new element to the plurality of elements.

16. The system of claim 8, wherein the document structure includes at least one hypertext markup language (HTML) element having a first textual tag identifier, and the logic that generates the obfuscated network page is configured to transform the first textual tag identifier into a second textual tag identifier.

17. The system of claim 8, wherein the document structure corresponds to a document object model (DOM).

18. The system of claim 8, wherein the document structure is specified by at least one hypertext markup language (HTML) file, and the visual appearance is configured at least in part by at least one cascading style sheet (CSS) associated with the at least one HTML file.

19. The system of claim 8, wherein the at least one application further comprises:
 logic that determines whether the client corresponds to a bypass client; and
 logic that sends the network page to the client instead of the obfuscated network page in response to determining that the client corresponds to the bypass client.

20. The system of claim 19, wherein the logic that determines whether the client corresponds to the bypass client is configured to determine whether a user agent field associated with the request corresponds to a known bypass client.

21. The system of claim 19, wherein the logic that determines whether the client corresponds to the bypass client is configured to determine whether the client is authenticated with an account associated with an enabled bypass setting.

22. The system of claim 19, wherein the bypass client is selected from the group consisting of: a screen reader client, a particular automated client, a client presenting an explicit bypass identifier, and a client with a particular browser version.

23. A method, comprising:
 receiving, via at least one of one or more computing devices, a request for a network page from a client;
 receiving, via at least one of the one or more computing devices, a plurality of network page components from a plurality of sources;
 generating, via at least one of the one or more computing devices, an obfuscated version of the plurality of network page components by altering a document structure of at least one of the plurality of network page components, including a first network page component followed by a second network page component, such that the second network page component is followed by the first network page component to inhibit automated extraction of data, wherein the at least one of the plurality of network page components is configured to have a visual appearance that is unmodified by the altering of the document structure;
 generating, via at least one of the one or more computing devices, the network page from the obfuscated version of the plurality of network page components; and
 sending, via at least one of the one or more computing devices, the network page to the client.

24. The method of claim 23, further comprising:
 determining, via at least one of the one or more computing devices, whether the client corresponds to a screen reader client; and
 generating, via at least one of the one or more computing devices, the network page from the plurality of network page components instead of the obfuscated version of the plurality of network page components in response to determining that the client corresponds to the screen reader client.

25. The method of claim 23, wherein at least some of the plurality of network page components correspond to hypertext markup language (HTML), wherein the visual appearance of the HTML is configured by a cascading style sheet (CSS).

26. The method of claim 23, wherein the document structure includes a plurality of elements, and the altering corresponds to a randomized modification to at least some of the plurality of elements.

27. The method of claim 23, further comprising:
 generating, via at least one of the one or more computing devices, a source code comment explaining an approach for automated access to content of the network page via an application programming interface (API); and
 embedding, via at least one of the one or more computing devices, the source code comment into the network page.

* * * * *